United States Patent [19]

Azibert et al.

[11] Patent Number: 4,625,977
[45] Date of Patent: Dec. 2, 1986

[54] CONVERTIBLE, STAND-BY ROTARY SEAL ASSEMBLY

[75] Inventors: Henri V. Azibert, Stoneham, Mass.; Robert E. Rockwood, Windham, N.H.

[73] Assignee: A. W. Chesterton Company, Stoneham, Mass.

[21] Appl. No.: 728,995

[22] Filed: Apr. 30, 1985

[51] Int. Cl.$^4$ .............................................. F16J 15/34
[52] U.S. Cl. ........................................ 277/82; 277/9; 277/32; 277/65; 277/93 SD
[58] Field of Search ................ 277/9, 12, 32, 81 R, 277/65, 82, 83, 85, 93 R, 93 SD, 237

[56] References Cited

U.S. PATENT DOCUMENTS

| | | | |
|---|---|---|---|
| 3,090,627 | 5/1963 | Tankus | 277/65 X |
| 3,222,075 | 12/1965 | Haeber | 277/9 |
| 3,441,284 | 4/1969 | Murray et al. | 277/32 X |
| 3,591,188 | 7/1971 | Eisner | 277/65 X |
| 3,675,933 | 7/1972 | Nappe | 277/65 X |
| 3,697,088 | 10/1972 | Hummer | 277/65 X |
| 3,727,923 | 4/1973 | McEwen | 277/9 |
| 3,811,687 | 5/1974 | Honold et al. | 277/65 X |
| 4,008,897 | 2/1977 | Wentworth | 277/9 |
| 4,127,275 | 11/1978 | Champlin | 277/32 X |
| 4,415,165 | 11/1983 | Martini | 277/65 X |

FOREIGN PATENT DOCUMENTS 2041467 9/1980 United Kingdom ........... 277/93 SD

Primary Examiner—Robert S. Ward

[57] ABSTRACT

A seal assembly has a pair of relatively rotatable sub-assemblies adapted to be attached and sealed respectively to relatively fixed and relatively rotatable members to confine the flow of fluid through the space between the members to a restricted passage. One of the sub-assemblies includes one of a pair of relatively rotatable seal rings. Coupling means are operable to selectively couple the other seal ring of the pair to a sub-assembly in a stand-by state in which the seal rings are not in relatively rotated engagement and, alternately, in a working state in which the seal rings are in relatively rotated engagement to seal the restricted passage. Preferably, the coupling means are operable while the sub-assemblies remain in respective installed positions; include means relatively movable to seal the opposed faces of the rings from the restricted passage in the stand-by state and to expose those faces to the passage in the working state, and are operable to couple the second seal ring alternatively to the respective sub-assemblies to provide the respective states of the seal rings. Preferably also, additional seal means are provided for sealing the restricted passage.

13 Claims, 9 Drawing Figures

CONVERTIBLE, STAND-BY ROTARY SEAL ASSEMBLY

BACKGROUND OF THE INVENTION

This invention relates to seal assemblies, particularly such assemblies which are used to seal the space between relatively fixed and relatively rotated members, one of which extends into the other. Usually, such members are a rotary shaft and a wall of a fixed housing, such as a pump casing, through which the shaft extends. The seals utilized are of the ring type, one rotated relative to the other in opposed seal face engagement, by the rotated one of the members.

With prior art seals of this type, when the seal fails, it has been necessary either to replace the seal assembly in entirety or to take the assembly apart so that the failed parts can be replaced. Either operation is a laborious one, involving long, expensive idle down time of the machinery of which the sealed members are a part. Having the seal replacement parts in a package attached to the assembly, as disclosed in U.S. Pat. No. 3,675,933, is a convenience but does not really solve the problem.

SUMMARY OF THE INVENTION

The present invention avoids the difficulties of replacing failed seal rings by providing a seal assembly of the type concerned that includes a ring type seal which can be readily converted between an inoperative stand-by state and an operative, working state. When this convertible seal is used as stand-by, back-up to another seal which fails, it is only necessary to convert this stand-by seal to its working state, without need to remove and replace the failed seal or parts thereof.

A seal assembly according to the invention includes a pair of sub-assemblies adapted to be attached, respectively, to the respective members to confine the space for fluid flow between them to a restricted passage. A pair of seal rings provides opposed seal faces engageable in relatively rotated relation to seal this restricted passage, a first of the rings forming part of one of the sub-assemblies. Coupling means are selectively operable to couple the second of the rings to one of the sub-assemblies in a seal-inoperative, stand-by state in which the opposed faces of the rings are not in relatively rotated engagement and, alternatively, to couple the second of the rings to one of the sub assemblies in a seal-operative, working state, sealing the restricted passage.

Preferred features include: coupling means which are operable while the sub-assemblies remain in respective installed positions, attached to the respective members between which the space to be sealed lies, and/or which include means relatively movable to seal the opposed faces of the seal rings from the restricted passage in the stand-by state and to expose these faces to the passage in the working state, and/or which are operable to couple the second of the seal rings alternatively to the respective sub-assemblies to provide the respective stand-by and working states of the seal and so that the rings are not relatively rotated in the stand-by state.

In the embodiment illustrated herein all of these preferred features are incorporated. A mounting for the second of the rings is provided which mounts it rotatably between and relative to both of the sub-assemblies. This mounting has springs which press the opposed faces of the rings into mutual engagement. In the stand-by state of the rings, the back-pressure of the springs forces a retainer of the mounting into a receiver fixed to the sub-assembly which includes the first of the rings, so that there is no relative rotation of the two rings. In this position, the mounting is accessible at an exposed end of the assembly when installed to push it in the opposite direction. This compresses the springs until they exert full sealing pressure of the second of the rings against the first and the retainer of the mounting is in position to be coupled fixedly to the other of the sub-assemblies by retainer clips thereon at the exposed end of the assembly. In this position of the second of the rings they are in the working state, in which they are in relatively rotated engagement. A shroud is movable by movement of the mounting from stand-by to working relation of the seals, from a position sealing the opposed faces of the rings from the restricted passage to a position exposing the opposed faces to the passage, and vice-versa.

Usually, the assembly includes additional seal means for sealing the restricted passage, spaced longitudinally of the passage from the convertible seal. This may be of any suitable type but is herein shown as a second ring type seal of conventional construction, although, if desired, it, too, may be provided with means to convert it from an operative to an inoperative state, with the opposed seal faces of the rings not in relatively rotated engagement, but not sealed from the restricted passage, since the only purpose is to disable fully an already failed seal. A dual seal assembly may be used optionally with the additional seal operating and the convertible seal in stand-by state, or with both seals operating simultaneously as a double seal assembly.

However, an assembly having only the convertible seal has various uses. It may be used as back-up for a second seal separately installed. Also, it may be used as a single seal, with an option to convert it to a stand-by, sealed state in case of long shutdowns or where sealing is needed only intermittently.

The assembly is capable of being shipped and installed or removed as a unit, the inner one of its coaxial sub assemblies being designed to sleeve over an end of the inner of the members to which it is to be attached, the other sub-assembly being designed to fit inside a surrounding outer member to which it is to be attached, both sub-assemblies having fittings at an end of the assembly exposed when in installed position for fixing the respective sub-assemblies in tight-sealed relation to the respective members. While the inner member to which the assembly is attached is usually a rotated shaft, the assembly is fully operative as described whichever of the members to which it is attached is rotated relative to the other.

DESCRIPTION OF THE PREFERRED EMBODIMENTS

Figure 2:
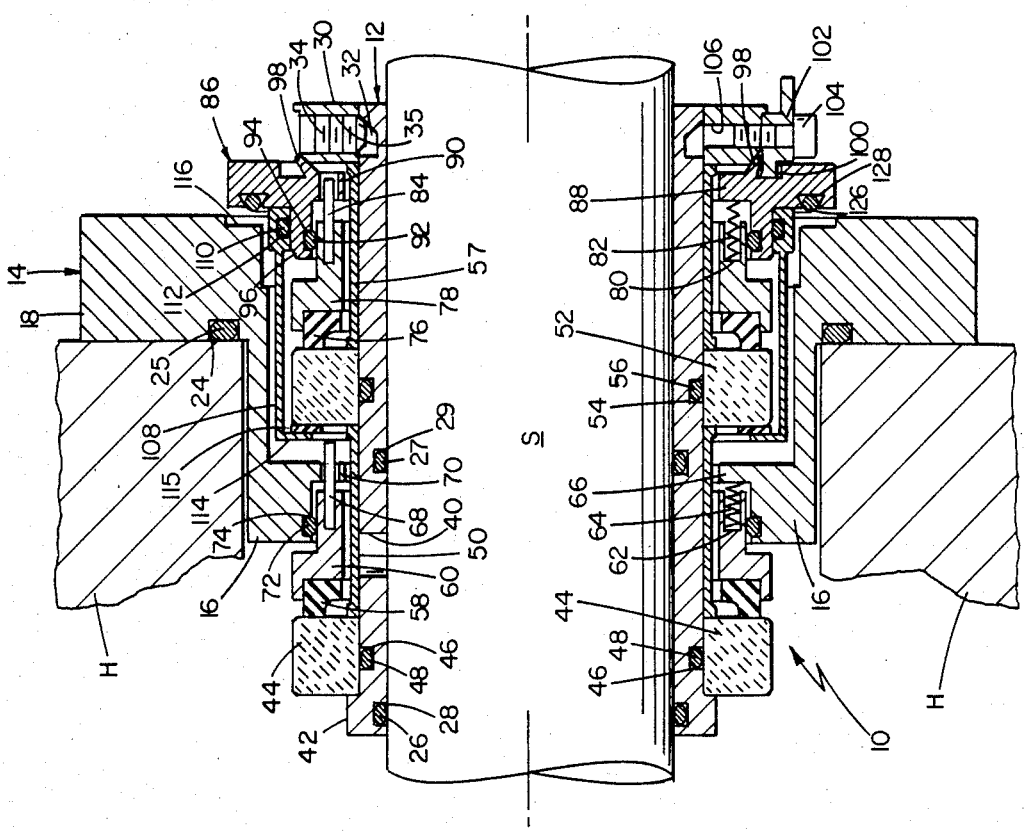
FIG. 2 is a cross-section view on lines 2—2 of FIG. 1, looking in the direction of the arrows.
Figure 1:
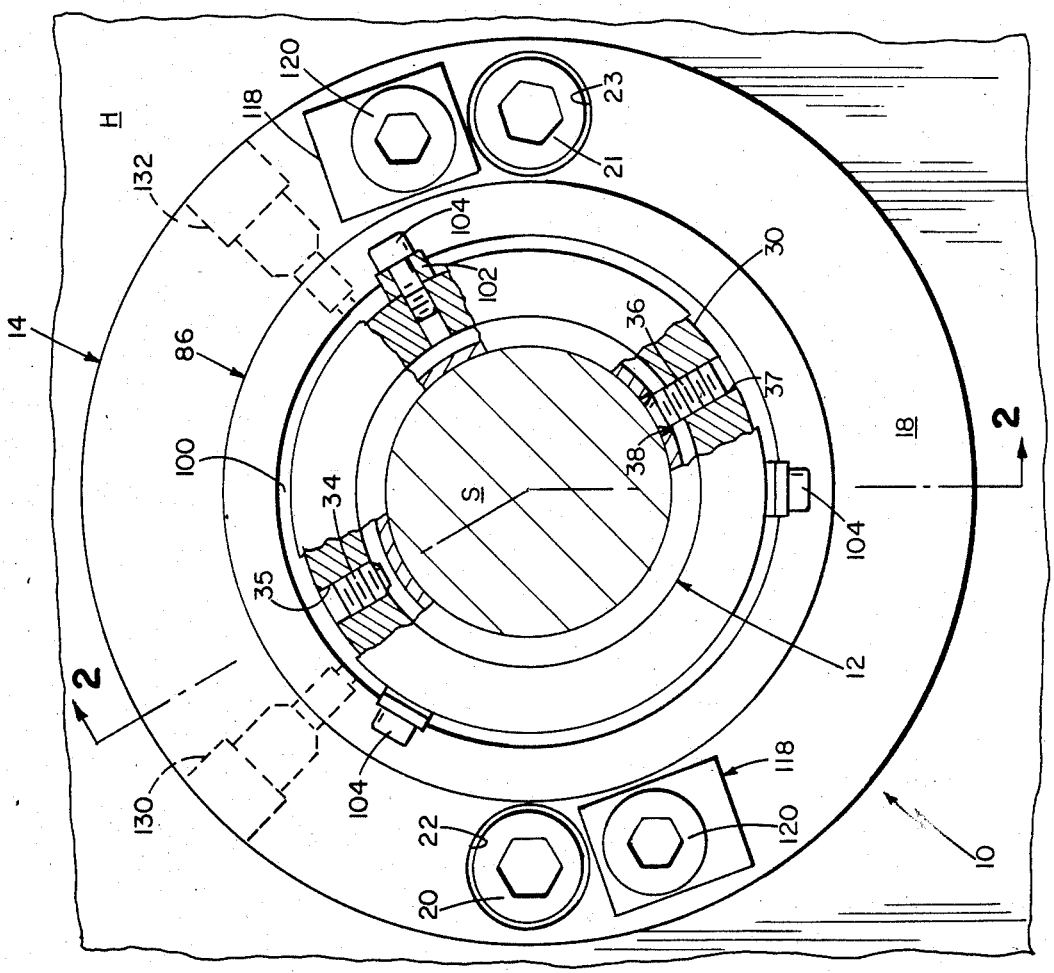
FIG. 1 is a front view of a two-seal assembly according to the invention, installed between a shaft and a housing fragmentarily shown, with parts of the assembly broken away to show interior construction and with the convertible seal in stand-by state.
Figure 4:
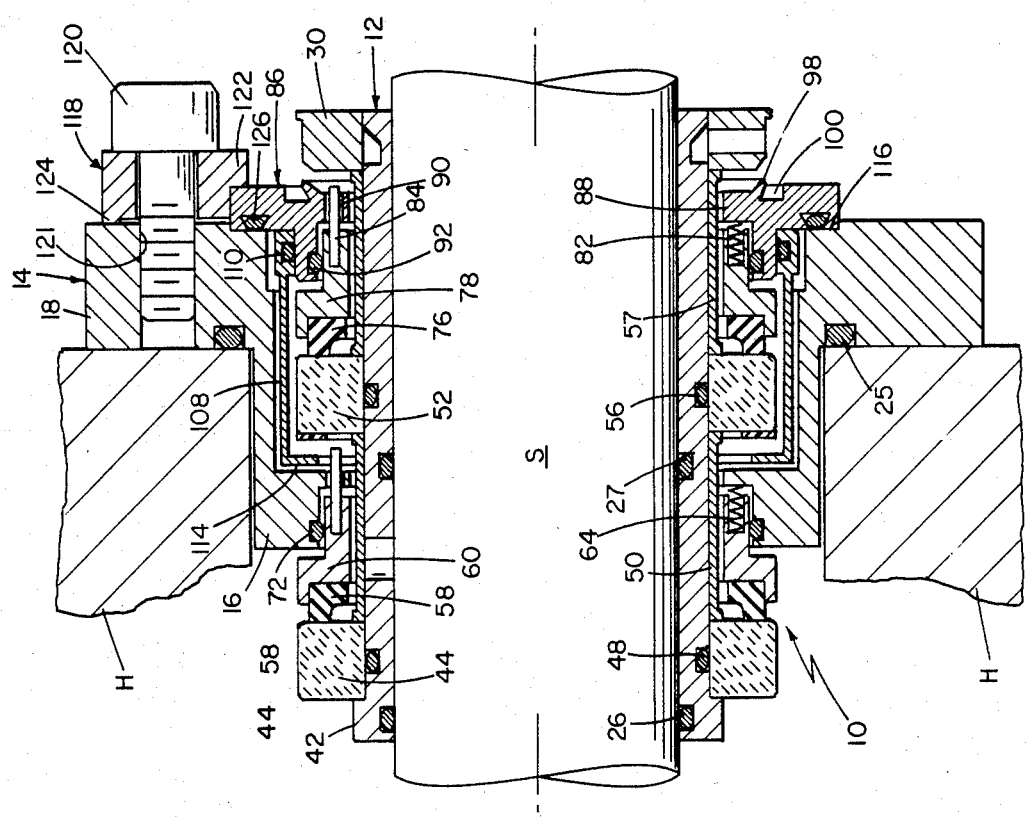
FIG. 4 is a cross section view on lines 4—4 of FIG. 3, looking in the direction of the arrows.
Figure 3:
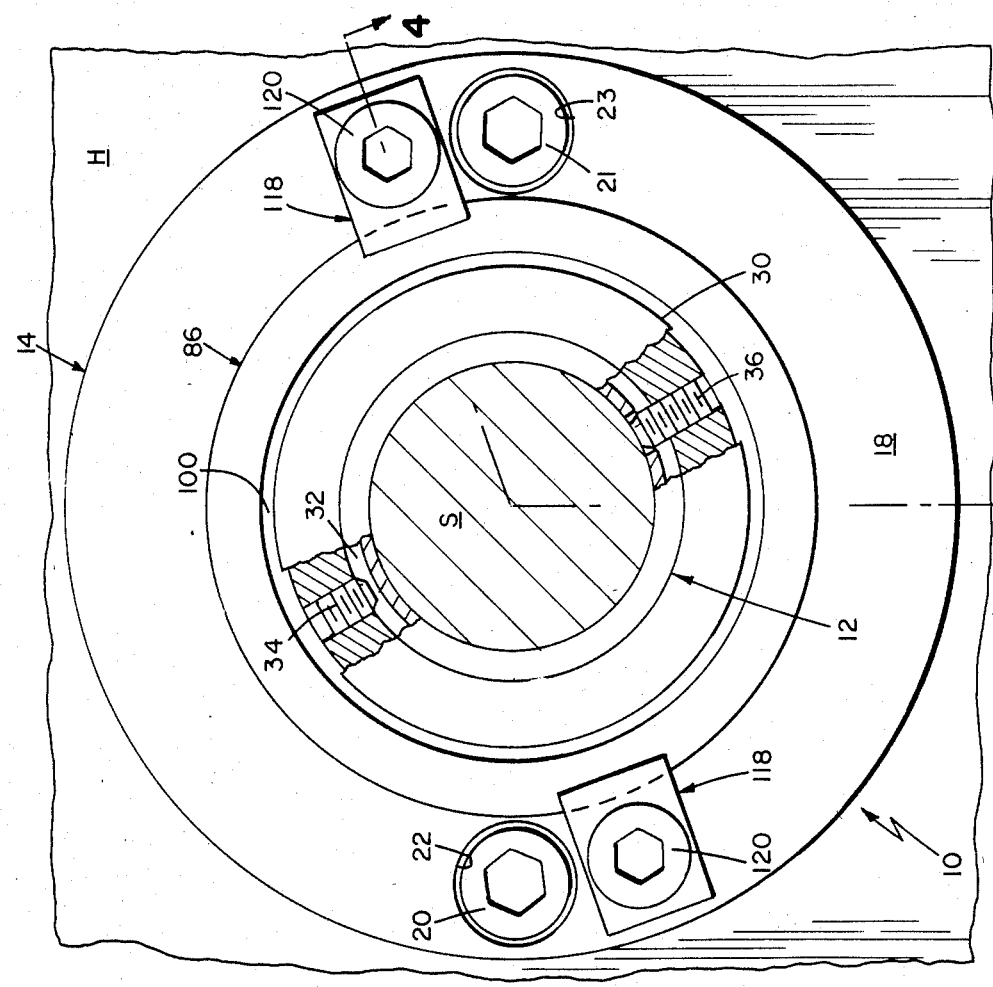
FIG. 3 is a front view similar to FIG. 1 of the embodiment shown in FIG. 1 with the convertible seal changed to the working state.
Figure 5:
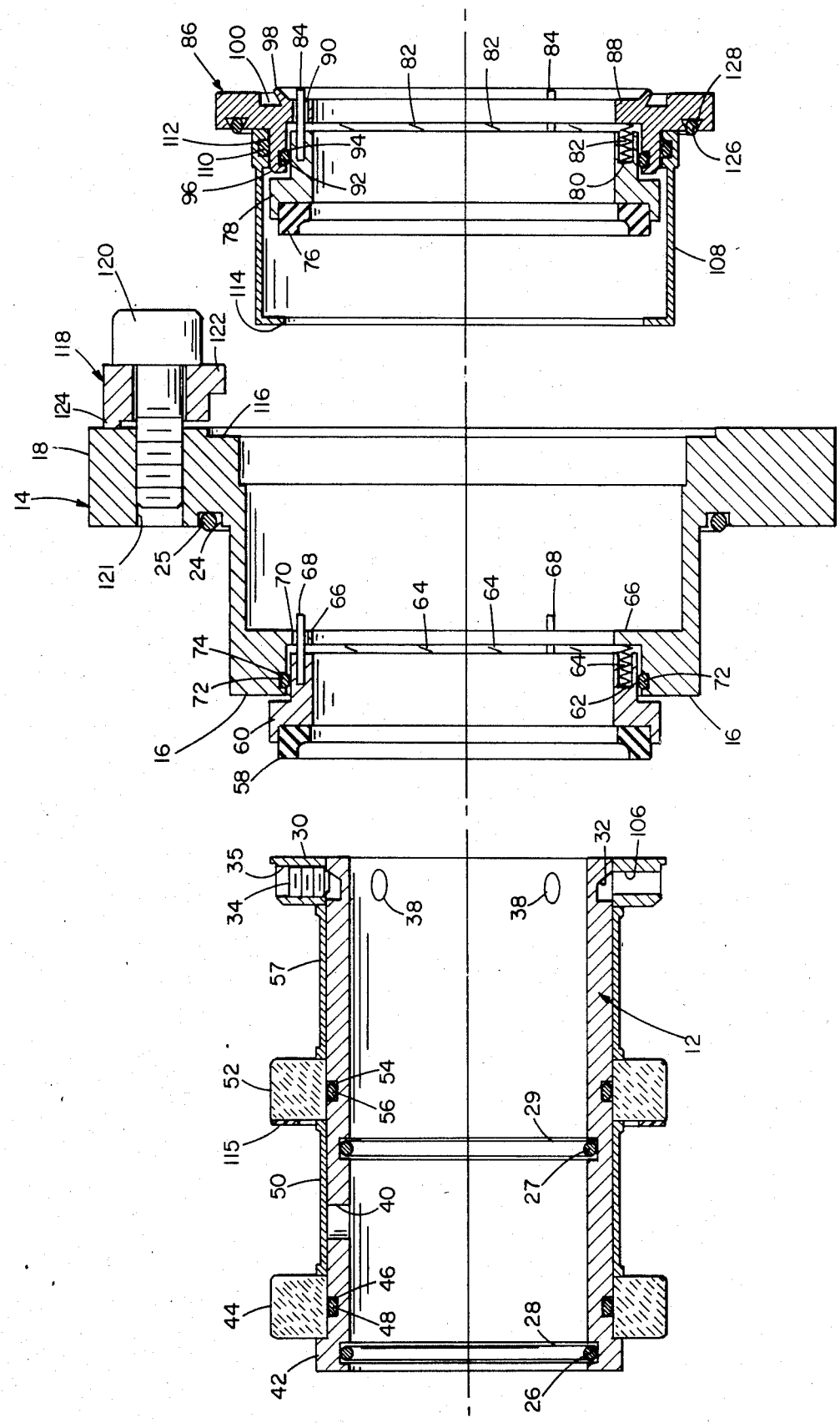
FIG. 5 is an exploded view of the assembly as shown in FIG. 4.

FIGS. 1 to 5 show the preferred embodiment of the convertible ring seal according to the invention in a two seal assembly, in which it is usually, but need not be, provided. FIGS. 1 and 2 show the parts positions when the convertible seal is in its stand-by state, while FIGS. 3, 4, and 5 show the parts positions when that seal is in its working state. In FIGS. 1 to 4 the space which the assembly is to seal is shown as between a shaft S as the inner member and a fixed housing H, such as a pump housing, as the outer, surrounding member. This is a common use, but it will be understood from the preceding description hereof, that the operative utility of the invention is independent of the specific nature of the members. The shaft member is normally rotated and the housing member fixed, but the device is fully operative whichever member is rotated relative to the other.

Referring first to FIGS. 1 and 2, the seal assembly, designated generally 10, has been assembled to shaft S by sliding its hollow interior, formed by the inner periphery of a sleeve, designated generally 12, over an end of the shaft. As the assembly was slid on the shaft, an annular gland, designated generally 14, was correspondingly moved so that its shank portion 16 entered the space between shaft S and the surrounding housing H, until its radial outer flange 18 abutted the face of housing H. The gland 14 is held fixed in this position by a pair of screws 20, 21 (FIGS. 1 and 3) which extend through openings 22, 23 in flange 18, spaced 180° apart, and are received in threaded apertures (not shown) in the underlying housing H. Openings 22, 23 are enlarged at their outer ends so that the screw heads may be counter-sunk as shown. The screws are of the hexagonal socket head cap screw type, which is generally used throughout.

Flange 18 of gland 14 has an annular groove 24 in its rear face (FIGS. 2, 4, 5) in which is retained an O-ring 25 that is compressed by the screw attachment against the housing H to seal the outer periphery of the space between the housing and shaft S, so that the flow of fluid through the space is confined to the interior of the gland. The space between sleeve 12 and shaft S is sealed by a pair of spaced O-rings 26, 27 held respectively in annular radial grooves 28, 29 in the interior surface of sleeve 12, the sleeve fitting the shaft closely enough so that O-rings 26, 27 are compressed when the sleeve is mounted on the shaft. Sleeve 1 therefore seals the inner periphery of the space between shaft S and housing H, so that fluid flow is confined to a restricted passage between the sleeve and gland 14 and parts sealed respectively to their inner surfaces.

Sleeve 12 is part of an inner sub-assembly of the assembly, shown separated to the left in the exploded view of FIG. 5. At its outboard or right-hand end in the Figures, a lock ring 30 is closely fitted to its outer surface, overlying a circumferential groove 32 in the outer surface of the sleeve. Ring 30 is fixed to the sleeve by three screws 34 (one shown in FIGS. 1-5) extended through threaded openings 35 spaced 120° apart in the ring, so that their beveled ends wedge against a slanting sidewall of groove 32 to fix the ring securely. Sleeve 12 is fixed against rotation relative to shaft S by three set screws 36 (one shown in FIGS. 1 and 3) extended through threaded openings 37 spaced 120° apart in ring 30, and through corresponding openings 38 through sleeve 12, to engage the shaft (FIGS. 1, 3, and 5). A vent hole 40 is provided through sleeve 12 between O-rings 26, 27 to prevent excessive pressure build-up in the sealed area between the O-rings, shaft and the sleeve.

As best seen in FIG. 5, the inboard end of sleeve 12 has a small enlargement 42 against which is seated one side of a seal ring 44, which overlies a circumferential groove 46 in the radially outer surface of sleeve 12, in compressive, sealing relation to an O-ring 48 seated in the groove 46. A spacer sleeve 50, surrounding sleeve 12 with close clearance, has one end abutting the opposite side of seal ring 44. The opposite end of spacer 50 abuts one side of another seal ring 52, which overlies a circumferential groove 54 in the radially outer surface of sleeve 12, in compressive, sealing relation to O-ring 56 seated in groove 54. Another like spacer sleeve 57 has one end abutting the opposite side of seal ring 52 and the other end engaging lock ring 30. Engagement of the fastening screws 34 of the lock ring with the sloping side of the groove 32 in sleeve 12 exerts biasing pressure, to clamp the seal ring and spacer assembly tightly between sleeve enlargement 42 and the lock ring.

Seal rings 44 and 52 are of conventional form and may be made, for example, of ceramic material or tungsten carbide, tungsten carbide with a six percent nickel binder being currently used for the purpose. Seal ring 44 cooperates with a second ring of the pair of a conventional, non-convertible ring seal in which the rings are held constantly pressed into sealing engagement and one is rotated relative to the other when the shaft is rotated relative to the housing or the housing is rotated relative to the shaft. Seal ring 52 cooperates with a second ring of the pair of the convertible seal according to the invention.

Describing first the conventional ring seal comprising ring 44, and referring principally to FIGS. 2, 4, and 5, this has a seal ring 58, preferably formed of carbon, of generally L-shaped cross-section which is seated in a correspondingly shaped cavity of an annular seal ring holder 60 so that one of its end portions projects to provide a side face opposed to and engaging the side of seal ring 44 facing seal ring 52. Holder 60 is generally Z-shaped in cross-section and has its longer axially disposed portion provided with a series of equal angularly spaced tubular cavities 62 (one of 12 being shown) each of which receives an end of a coil spring 64, the other, exposed end of which bears against an inward, annular projection 66 of shank 16 of gland 14. This portion of holder 60 is also provided with three equal angularly spaced cavities in each of which is fixedly secured an end of a pin 68 (one shown in FIGS. 2 and 4). The other end of each pin 68 extends slidably into and through an aperture 70 (one shown) in projection 66, so that engagement of the pins 68 with the walls of apertures 70 prevents rotation of holder 60 and seal ring 58 relative to projection 66 of gland 14 but so that the pins can slide axially in the receiving holes.

The longer axial leg of seal ring holder 60 is mounted within the slightly larger diameter annular end of shank 16 of gland 14, sealably but axially slideable, by means of an O-ring 72, seated in a cavity 74 in the face of the shank opposed to the holder. O-ring 72, together with O-rings 26, 27, and 48, confine the flow of fluid in either direction in the space between shaft S and housing H to a restricted passage between seal holder 60 and seal ring 44 which extends between, and is sealed by, the relatively rotated engagement of the opposed faces of seal rings 44 and 58, the latter under the constant, resilient operating pressure of springs 64.

Describing now the outboard, convertible seal according to the invention, this has seal ring 52 fixed to sleeve 12 as one of the rings of its pair. Ring 52 may be, as shown, the same as ring 44 of the pair previously described. The other ring of the pair 76, and its holder 78 may, as shown, be the same as ring 58 and its holder 60 previously described, the holder 78 thus having twelve equally spaced cavities 80 each receiving an end of a coil spring 82 and three equally spaced cavities in each of which is secured an end of a pin 84. But whereas holder 60 is secured to gland 14, holder 78 is mounted to an annular retainer plate, designated generally 86, which is rotatable between, and with respect to, both the sub-assembly including sleeve 12 and parts secured to it and the sub-assembly including gland 14 and parts secured to it, having relatively rotatable clearance from spacer sleeve 57 which it surrounds.

Holder 78 is mounted to retainer 86 by pins 84 extended through three equally spaced apertures 90 in extension 88, which prevent relative rotation of holder 78 and retainer 86, and by an O-ring 92, retained in a groove 94 in the inner surface of axial shank 96 of retainer 86. Retainer 86 is sleeved over the longer axial portion of holder 78, so that the holder 78 is held in sealed but slidable relation thereto by O-ring 92. Retainer 86 is positioned between the sub-assembly comprising sleeve 12 and the sub-assembly comprising gland 14 so that seal ring 76 is in constant engagement with seal ring 52, but is axially movable between a position in which it couples the ring 76 non-rotatably to sleeve 12, as shown in FIGS. 1 and 2, its stand-by position, and a position in which it couples ring 76 non-rotatably to the sub-assembly including gland 14, the working position.

In the stand-by position, springs 82 force retainer 86 axially in the outboard direction so that the inside surface of an outwardly extending, inclined lip ring 98 on the outboard face thereof tightly engages on an inclined, beveled edge of the inside of lock ring 30 which forms a receiver for the retainer. Lip ring 98 forms the bottom of a groove 100 in which is received, in this position of the parts, the ends of the shorter of two opposite, radially spaced arms of three centering and retaining clips 102. Clips 102 are mounted on the radially outer surface of clamp ring 30 by screws 104 received in threaded apertures 106 in lock ring 30. While springs 82 are sufficiently strong to force retainer 86 into non-rotative engagement with lock ring 30, clips 102, pressing lip ring 98 of retainer 86 against the beveled edge receiver of lock ring 30, provide further retaining force and also insure against off-centering.

Retainer 86 is also provided with an annular shroud 108, secured and sealed at its outboard end to the radially outer surface of axial extension 96 of retainer 86 by O-ring 110 held in annular groove 112 in the radially inner surface of this end of the shroud 108. The inboard end of shroud 108 has a radially outward extension 114 which, in this coupled position of retainer 86, sealingly engages a gasket ring 115 (teflon) cemented to the inboard side of the other seal ring 52 of this pair of seal rings.

In this stand-by position of the convertible seal, it will be seen that the restricted passage between the sub-assembly including sleeve 12 and the sub-assembly including gland 14, extends from seal ring 58 of the other seal past its holder 60 and then between shroud 108 and gland 14, being open to atmosphere between retainer 86 and gland 14, the retainer extending slightly outboard of the gland in this position. Shroud 108 and O-ring 110 therefore seal the opposed, engaged faces of seal rings 52 and 76 from the restricted passage. The engagement of lip 98 of retainer 86 with the receiver of lock ring 30 sufficiently shields the interior of shroud 108 from contaminants, such as dust or smoke particles, in the ambient atmosphere, while seal ring 52 and O-ring 56 seal the interior from the restricted passage. The opposed faces of seal rings 52 and 76 are thus sealed from the restricted passage in non-relatively rotatable engagement because they are secured to the same sub-assembly including sleeve 12.

To convert the seal rings 52, 76 from stand-by state to working state, screws 104 and clips 102 are removed. Retainer 86 is then pushed inwardly against the pressure of springs 82 to the position of FIG. 4, in which its outer peripheral portion seats against a radially inner depressed portion 116 of the front surface of flange 18 of gland 14. Retainer 86 is locked tightly in this position by a pair of retainer clips, designated generally 118, mounted by screws 120 in threaded apertures 121 spaced 180° apart on the radially outer front surface of flange 18 of gland 14 surrounding portion 116. To accomplish this, screws 120 are loosened, clips 118 are turned 90° from the idle position in which they are shown in FIG. 1 to a clamping position shown in FIGS. 3 and 4, wherein a projecting lip 122 on one end of the clip seats tightly against the front face of retainer 86. As can be seen from FIG. 4, clips 118 have a small axial projection 124 from the opposite end of the side opposite lip 122, which biases the lip axially against portion 116 of gland flange 18 when screws 120 are re-tightened. Clips 118 also serve to compress an O-ring 126, in a groove 128 in the face of retainer 86 opposite the face engaged by clip lips 122, into sealing relation with portion 116 of gland flange 18.

Retaining and centering clips 102 are not reapplied to the lock ring 30, since the retainer clips 118 fix retainer 86 to gland 14 in centered position, and gland 14 and sleeve 12 are relatively fixed to the housing and shaft, respectively. However, until fixed on installation, sleeve 12 and gland 14 are free to move axially to a limited extent relative to one another, so that clips 118 cannot be relied on to retain the gland and the sleeve assemblies in the working position of the convertible seal shown in FIG. 4. In this situation, the pressure of springs 82 forcing seal ring 76 against seal ring 52, which is fixed to sleeve 12, tends to force the gland 14 to move relative to the sleeve in the outboard direction, until retainer 86 is returned to engagement with lock ring 30. To prevent such movement during storage or shipment of the assembly in the working position of seal rings 52, 76, clips 102 may be reapplied by screws 104 to lock ring 30, turned over so that their longer, thinner arm is aligned with and projects into groove 100 of retainer 86 to maintain the relative spacing of sleeve and gland.

Movement of retainer 86 inward to its position locked to gland 14 not only compresses the springs 82 to exert full sealing pressure to force seal ring 76 against seal ring 52, but also moves shroud 108 correspondingly, so that portion 114 of the shroud is shifted out of sealing relation with gasket ring 115 on seal ring 52 to a position adjacent the end of shank 16 of gland 14, as can be seen in FIG. 4. The restricted passage between the sub-assemblies including sleeve 12 and gland 14, respectively, now lies inside shroud 108, instead of outside it in the FIG. 2 position. The opposed faces of seal rings 52 and 76 are now exposed to the restricted passage which they seal. The passage now extends over seal ring 52, between the opposed faces of seal rings 52 and 76, and through the clearances of holder 78 and retainer 86 from spacer 57 (which is now rotatable with respect to them) and between the outer end of holder 86 and lock ring 30 to atmosphere.

Commonly, the assembly is installed with the convertible seal in the stand-by state shown in FIGS. 1 and 2, in which it remains, with the other seal rings 44 and 58 forming the only operating seal until failure of this operating seal is detected. Thereupon, seal ring 76 is converted from its stand-by state to its working state with seal ring 52, as just explained. However, it will be understood that the convertible seal can be in the working position of the rings at the outset, or converted thereto at any time during the operating life of the other seal, so that the assembly operates as a double seal of the restricted passage, which then extends between the opposed faces of each pair of seals and is sealed by each pair. In case only intermittent double sealing is desired, the convertible seal can be converted back and forth between its stand-by and working states as required.

In case of use of the assembly as a double seal, the heat generated by two sets of operating seals may make it desirable to provide a flow of cooling fluid to the seals and their holders, particularly the outboard seal. For this purpose, there may optionally be provided two circumferentially spaced openings 130, 132, shown in dashed lines in FIG. 1, in flange 18 of gland 14, extending through the radially outer and inner end faces of flange 18. The outer ends of openings 130, 132 are provided with fittings for couplings to a fluid circulation system (not shown). For optimal functioning of such fluid circulation system, shroud 108 should be removed, since it would interfere with the desired circulation of the fluid and does not have any function in the working state of the convertible seal. With shroud 108 removed, the fluid flows from the inlet opening 130 or 132, to O-ring 92 which, together with retainer 86 in the FIG. 4 position, stops one end of it; over holder 78 and seal rings 76, 52; through the clearances of the end of extension 66 of shank 16, of holder 60 and of seal ring 58 from spacer 50 to be stopped by the seal rings 44, 58; also over the end of holder 60 where it is stopped at O-ring 72; and out the outlet opening 130 or 132.

In assembling the embodiment of FIGS. 1 to 5, referring particularly to FIG. 5, O-rings 26 and 27 are inserted in grooves 28 and 29, respectively, in the radially inner periphery of sleeve 12, O-ring 48 is seated in groove 46 in its radially outer periphery, and seal ring 44 is then slid over the right-hand end of sleeve 12 in FIG. 5 ("outboard end") to its position shown in FIGS. 2, 4, and 5. Spacer 50 is then slid over the outboard end of sleeve 12 until it abuts seal ring 44, and O-ring 56 is similarly applied to its groove 54, so that sleeve 12 now has only seal ring 44, O-ring 48, spacer 50, and O-ring 56 assembled to its radially outer surface. The sub-assembly including gland 14, shown in the middle part of FIG. 5, is then, or has previously been, put together as shown, by applying O-rings 25 and 72 to their respective grooves 24, 74, by inserting seal ring 58 in the end of holder 60, and by sleeving holder 60 into O-ring 72 so that pins 68 extend into openings 70 in portion 66 of the shank 16 of gland 14 so that the exposed ends of springs 64 bear against portion 66. The sub-assembly is now slid over the outboard end of sleeve 12 to its position shown in FIGS. 2 and 4.

Shroud 108, with seal ring 52 and spacer 57 assembled inside it, and O-ring 110 in its holder 112, is slid over axial portion 96 of retainer 86, which, as shown at the right end of FIG. 5, has seal ring 76 and holder 78 assembled thereto in like manner to the assembly of seal ring 58 and holder 60 to gland 14 just described. This assembly to retainer 86 is next slid over the end of the shaft until seal ring 52 abuts spacer sleeve 50. Lock ring 30 is now applied to its position shown, secured to sleeve 12 therein by screws 34, so that the retainer and lock ring are in their stand-by state of engagement shown in FIG. 2, and clips 102 are attached to lock ring 30 by screws 104, with their shorter arm engaged in groove 100 of retainer 86.

Figure 6:
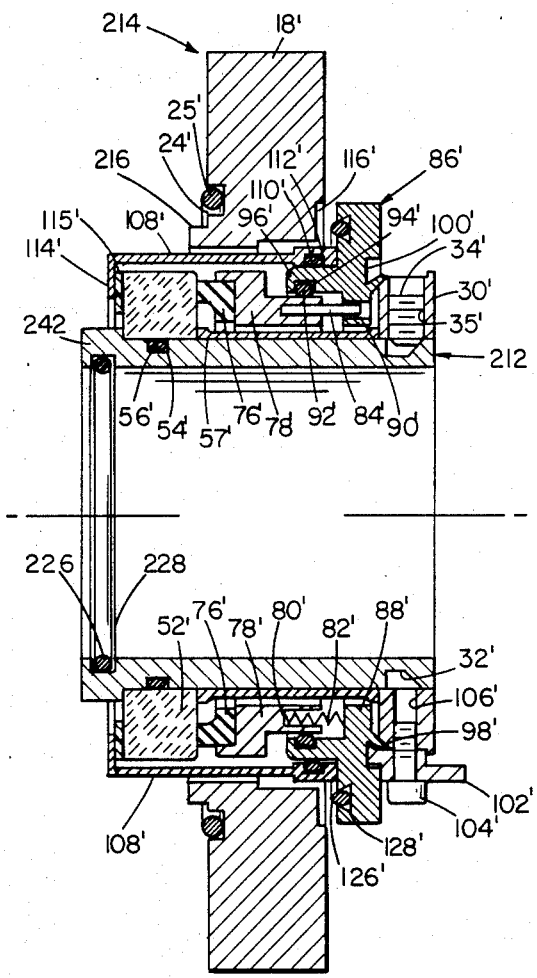
FIGS. 6 and 7 are cross-section views corresponding to FIGS. 2 and 4, respectively, but with the housing and shaft omitted, of a modified embodiment having a single, convertible seal.
Figure 7:
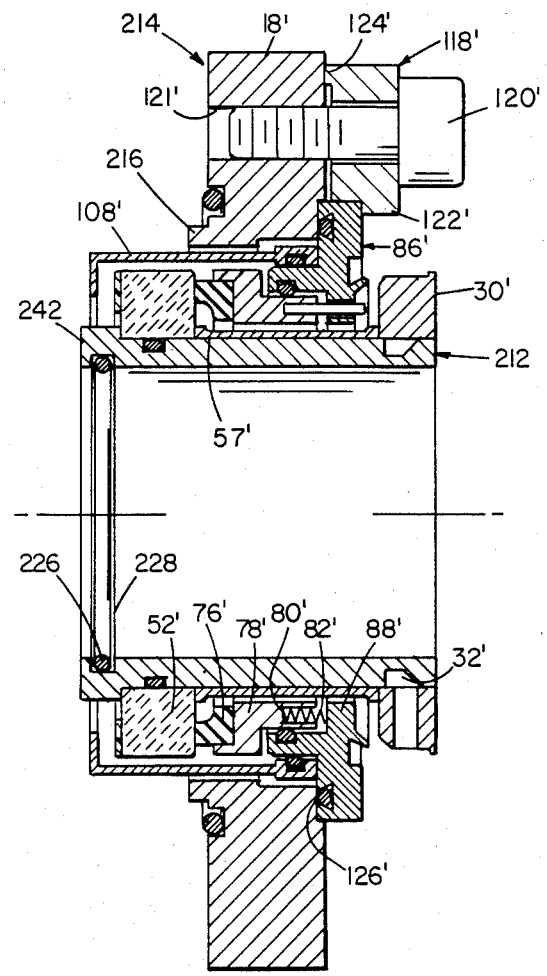

FIGS. 6 and 7 show the two seal assembly of FIGS. 1–5 changed to a single convertible seal assembly. In these Figures, parts that are the same as in FIGS. 1 to 5 have primes of the same reference numerals, while parts modified have the same reference numerals plus 200.

Comparing FIGS. 6 and 7 particularly with FIG. 5 it will be see that the assembly of parts of the convertible seal shown separated at the right end of FIG. 5 remains the same in all respects. In the assembly of parts shown separately in the middle of FIG. 5, gland 14 in FIG. 5 has been modified to gland 214 by omitting shank 16 and the seal ring assembly mounted in it, and substituting a shortened shank 216 with no part connected to it. Flange 18' of so-modified gland 214, and all parts connected to it and their operation, remain the same as in FIGS. 1 to 5. In the assembly of parts shown separated at the left end of FIG. 5, sleeve 12 has been modified to sleeve 212 by omitting the part thereof to the left of seal ring 52 in FIG. 5, and all parts connected to it, and substituting an enlarged end 242 engaging seal ring 52' and with O-ring 226 in slot 228 for sealing the sleeve to the shaft (not shown). The remainder of this assembly of parts, and their operation, remain the same as in FIGS. 1 to 5.

The steps involved in converting the seal of FIG. 6 and 7 between its stand-by state of FIG. 6 and its working state of FIG. 7 remain the same as described in connection with previous Figures. As previously indicated, the embodiment of FIGS. 6 and 7 may be used as the only seal, in which case the space between the members would not be sealed with the convertible seal in stand-by state. Shifting from the working state to the stand-by state could nevertheless be desirable in case of long shutdowns, because of the protection of the seal rings from atmospheric contaminants provided in that state. Separate seal or seals of the ring type or other types may be provided inboard of the convertible seal, which can then have a backup function.

In the embodiment shown in FIGS. 1 to 5, the inboard of the two pairs of ring seals is left fixed in operative, relatively rotated engagement after it fails. Once that ring pair has failed, further wear of its rings is of no consequence and the power loss in keeping the seal running is small. The replacement of this seal when worn as the operative seal is accomplished merely by converting the rings 52, 76 from the stand-by to the operative state, without disturbing the installed positions of the sub-assemblies including sleeve 12 and gland 14, respectively. However, in case it should be desired to stop the relatively rotated engagement of the failed seal rings 44, 58, FIGS. 8 and 9 show a modification of gland 14 of FIGS. 1–5 in this part of the assembly, by which such disablement of the seal rings 44, 58 upon their failure may be readily accomplished without taking the assembly apart and, indeed, in at least one type of installation, without disturbing the installed position of the assembly.

Figure 8:
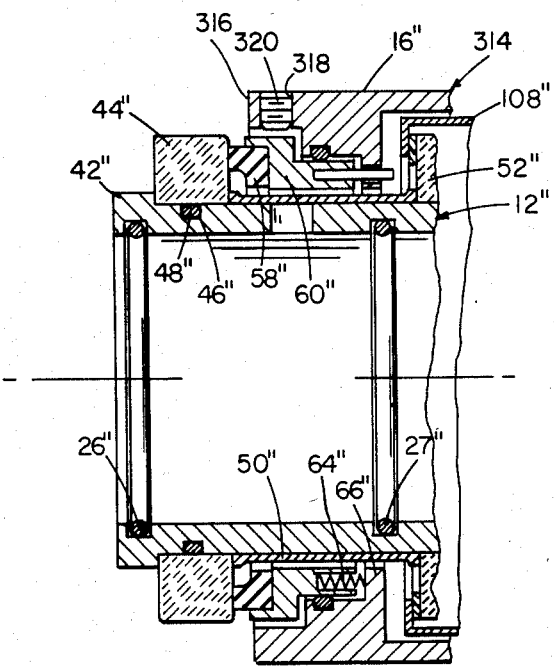
FIGS. 8 and 9 are cross-section views similar to FIGS. 2 and 4 of a modification in the end portion of the assembly shown in FIGS. 1-5 including its non-convertible seal, the housing and shaft being omitted.
Figure 9:
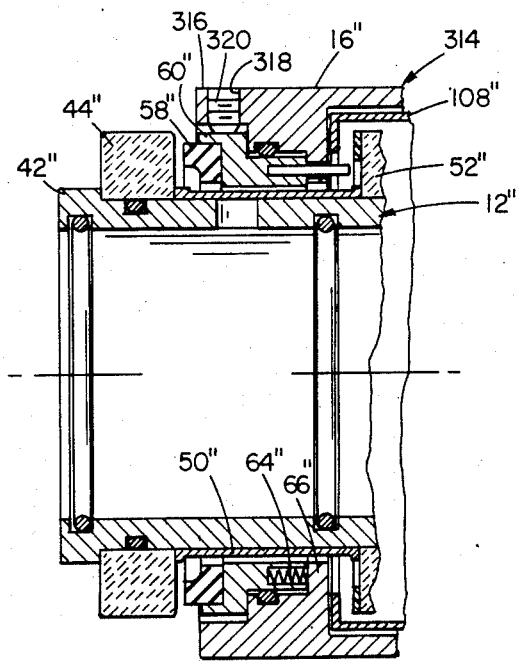

In FIGS. 8 and 9, parts which are the same as in FIGS. 1 to 5 have double primes of the same reference numerals. FIG. 8 corresponds to a left end portion of FIG. 2, and FIG. 9 corresponds to the same portion of FIG. 4.

It will be seen that the only modification has been to the gland 14 structure of FIGS. 1 to 5, the modified gland being designated generally 314. The modification has been the addition of an annular extension 316 to the inboard end of shank 16" of the gland, extending over and surrounding the inboard end of holder 60" of seal ring 58". Extension 316 is provided with a threaded aperture 318, in which is received a matingly threaded clamp screw 320. (One aperture 318 and screw 320 are usually sufficient and are preferred for ease of access, but more can be used).

In FIG. 8, which corresponds to the stand-by state of seal rings 44", 58", screw 320 is not functional and is simply retained in aperture 318 for later use. FIG. 9, however, represents a time when seal rings 44", 58" have failed and the convertible seal rings (ring 52" partly shown) have been converted to their working state. At that time, or at any desired time, holder 60" may be pushed toward the outboard end of the assembly, further compressing springs 64" until the holder abuts the annular projection 66" of shank 16" of gland 314 and seal ring 58" is moved clear of seal ring 44". Clamp screw 320 may then be turned to extend into engagement with holder 60" to clamp it in the position with seal rings 44" and 58" spaced apart.

In at least one type of applications of seal assemblies according to the invention, the outer member or housing H is provided with hand holes having removable gasketed covers by which access to the tubular space between it and the surrounded member or shaft S may be had. In such cases, the moving and clamping of holder 60" to hold seal rings 44" and 58" out of engagement, may be accomplished without disturbing the installed condition of the assembly as a whole. Otherwise, it may be necessary to detach the gland from the outer member (housing H), loosen the set screws fixing sleeve 12" to the inner member (shaft S) and to slide the whole assembly out of the passage so that access may be had for these operations. However, no disassembly of the assembly itself will be required.

While the arrangement of FIGS. 8 and 9 provides a seal convertible between seal operative and seal inoperative states, the convertible seal arrangement shown in the other Figures is much preferred, when the purpose is other than preventing further rotated engagement of failed seal rings, for a number of reasons. For example, the arrangement of the other Figures is superior in that in the inoperative state, the seal rings are maintained in engagement but not relatively rotatable, the rings are sealed from the restricted passage, and the springs of the carbon seal ring holder are relatively relaxed, rather than relatively compressed, as compared to their condition in the operative position.

Preferred materials of construction for the seal rings and gasket ring 115 have been given above. The O-rings are preferably of synthetic rubber produced by E. I. DuPont De Nemours & Co. under the trademark Viton and springs 64, 82 are preferably of nickel base alloy available from Haynes-Stellite Co. under the trademark Hastelloy Alloy C. The other parts are preferably made of stainless steel. However, such preferances are only for ordinary applications, and particular applications may require, or make desirable, other materials of construction.

We claim:

1. A seal assembly for sealing the space between relatively fixed and relatively rotated members one of which extends into the other, including:

first and second relatively rotatable sub-assemblies adapted respectively to be attached and sealed to said respective members to confine the flow of fluid through said space to a restricted passage between them;

first and second seal rings having opposed sealing faces engageable in relatively rotated relation to seal said passage, a first of said seal rings forming part of said first sub-assembly; and coupling means selectively operable to couple said second of said seal rings alternatively to said first sub-assembly in a seal-inoperative, stand-by state wherein said rings are not relatively rotated and to said second assembly in a seal operative, working state wherein said opposed faces of said seal rings are in relatively rotated engagement to seal said restricted passage.

2. A seal assembly according to claim 1 wherein said coupling means are operable while said sub-assemblies remain in respective installed positions attached to said respective members.

3. A seal assembly according to claim 1 wherein said coupling means include means relatively movable to seal the opposed faces of said seal rings from said restricted passage in said stand-by state and to expose said faces to said passage in said working state.

4. A seal assembly according to any of claims 1 to 4 which includes additional seal means for sealing said restricted passage against flow of fluid therethrough, spaced longitudinally of said passage from said pair of seal rings.

5. A seal assembly according to claim 1 wherein said coupling means includes mounting means rotatably mounting said second of said seal rings between and relative to both of said sub-assemblies, and means for alternatively fixedly coupling said mounting means to said respective sub-assemblies.

6. A seal assembly according to claim 5 which includes an annular shroud movable in said assembly between a position sealing said opposed faces of said rings in the stand-by state thereof from said restricted passage, and a position exposing said opposed faces to said restricted passage in said working state thereof.

7. A seal assembly according to claim 6 wherein said mounting means includes resilient means for pressing a face of the seal ring mounted thereby against the opposed face of the other of said seal rings whether said rings are in their working or stand-by states.

8. A seal assembly according to claim 7 wherein said mounting means includes an annular retainer, the one of said sub-assemblies including the first of said rings is provided with a receiver for said retainer and the back pressure of said resilient means forces said retainer into coupled fixed engagement with said receiver in the stand-by state of said rings.

9. A seal assembly according to claim 8 wherein, in said stand-by state of said rings, said retainer is exposed at an end of the assembly by which it may be pushed against the back-pressure of said resilient means to move said second of said rings out of coupled engagement with said receiver to the working position in which the sealing face thereof is forced against the opposed sealing face of the other of said rings with operative sealing pressure, and clip means are provided on an end of the sub-assembly not containing said first of said rings for fixing said retainer thereto with said second of said rings in said working position.

10. A seal assembly according to claim 9 wherein said shroud is movable by said mounting means between its said sealing and exposing positions.

11. A seal assembly according to any of claims 5, 6, or 10 which includes additional means for sealing said restricted passage against flow of fluid therethrough, spaced longitudinally of said passage from said pair of seal rings.

12. A seal assembly according to claim 11 wherein said additional means comprises an additional pair of seal rings respectively secured to said respective members.

13. A seal assembly according to claim 12 which includes a holder for one of said additional pair of rings movable axially of said assembly with respect to the other of said rings, resilient means urging said holder to an operative position of said rings in which the opposed seal faces of said rings are pressed together by said resilient means, said holder being movable against the back pressure of said resilient means to an inoperative position of said rings wherein the opposed seal faces of said rings are in spaced relation to one another, said holder being accessible from the exterior of said assembly for said movement, and means accessible from the exterior of said assembly for securing said holder in said inoperative position.

* * * * *